United States Patent
Xu et al.

(10) Patent No.: US 11,325,210 B2
(45) Date of Patent: May 10, 2022

(54) MICRO/NANO PARTICLE REINFORCED COMPOSITE SOLDER AND PREPARATION METHOD THEREFOR

(71) Applicant: Shenzhen Fitech Co., Ltd., Shenzhen (CN)

(72) Inventors: Pu Xu, Shenzhen (CN); Siyuan Wang, Shenzhen (CN); Daoke Yu, Shenzhen (CN); Kui Chen, Shenzhen (CN); Jianhao Shi, Shenzhen (CN)

(73) Assignee: Shenzhen Fitech Co., Ltd., Shenzhen (CN)

( * ) Notice: Subject to any disclaimer, the term of this patent is extended or adjusted under 35 U.S.C. 154(b) by 151 days.

(21) Appl. No.: 16/482,301

(22) PCT Filed: Dec. 7, 2017

(86) PCT No.: PCT/CN2017/114887
§ 371 (c)(1),
(2) Date: Jul. 31, 2019

(87) PCT Pub. No.: WO2019/100445
PCT Pub. Date: May 31, 2019

(65) Prior Publication Data
US 2020/0001406 A1    Jan. 2, 2020

(30) Foreign Application Priority Data
Nov. 22, 2017 (CN) .......................... 201711173676.0

(51) Int. Cl.
*B22F 9/08* (2006.01)
*B23K 35/26* (2006.01)
(Continued)

(52) U.S. Cl.
CPC ........ *B23K 35/262* (2013.01); *B23K 35/0244* (2013.01); *B23K 35/40* (2013.01); *C22C 13/02* (2013.01)

(58) Field of Classification Search
None
See application file for complete search history.

(56) References Cited

U.S. PATENT DOCUMENTS

| | | | |
|---|---|---|---|
| 2006/0261131 A1* | 11/2006 | Hirata | B23K 35/262 228/101 |
| 2014/0332116 A1* | 11/2014 | Hwang | B22F 1/0003 148/24 |
| 2017/0225277 A1* | 8/2017 | Sharma | B23K 35/26 |

FOREIGN PATENT DOCUMENTS

| CN | 105081600 A | * 11/2015 |
|---|---|---|
| CN | 105081600 A | 11/2015 |

(Continued)

OTHER PUBLICATIONS

English translation of CN 105081600 (originally published Nov. 25, 2015) from Espacenet.*

*Primary Examiner* — George Wyszomierski
(74) *Attorney, Agent, or Firm* — PROI Intellectual Property US

(57) ABSTRACT

A micro/nanoparticle-reinforced composite solder for low-temperature soldering and a preparation method thereof belong to the manufacturing field of lead-free low-temperature soldering solders. Micro/nanoparticle-reinforced tin-based alloy solder powder is formed by diffusely mixing micro/nano-sized Cu, Ag and Sb particles with a molten metal tin and atomizing the mixture, and then blended with low-melting-point SnBi-based alloy solder powder and a conventional flux to prepare a micro/nanoparticle-reinforced composite solder. In soldering at a temperature below 200° C., tin atoms in the molten micro/nanoparticle-reinforced (Continued)

tin-based alloy form an intermetallic compound on a soldering pan in preference to the low-melting-point SnBi-based alloy, and the micro/nanoparticles are dispersed in soldered joints to form a "separator effect", which blocks atoms in the SnBi-based alloy from being precipitated and bonded with the soldering pan, thereby inhibiting the growth of a Bi-rich layer, and solving the problem of brittle and unreliable soldered joints in lead-free low-temperature soldering.

6 Claims, 6 Drawing Sheets

(51) Int. Cl.
  *B23K 35/02* (2006.01)
  *B23K 35/40* (2006.01)
  *C22C 13/02* (2006.01)

(56) References Cited

FOREIGN PATENT DOCUMENTS

| | | |
|---|---|---|
| CN | 105081660 A | 11/2015 |
| JP | 2013082004 A | 5/2013 |
| JP | 2014527466 A | 10/2014 |

* cited by examiner

US 11,325,210 B2

MICRO/NANO PARTICLE REINFORCED COMPOSITE SOLDER AND PREPARATION METHOD THEREFOR

FIELD OF THE INVENTION

The invention relates to a solder for low-temperature soldering, and particularly to a lead-free tin-based low-temperature soldering solder characterized by material components and properties and a preparation method thereof, especially a lead-free tin-based low-temperature soldering solder for a soldering temperature of 200° C. or less.

BACKGROUND OF THE INVENTION

The rapid development of the electronic technology in the modern society imposes higher requirements on electronic products in terms of environmental friendliness and energy consumption, and therefore lead-free, light and highly-functional electronic products have become a trend. New light and thin microchips generally cannot withstand the high temperature of soldering, and especially the defects of soldered joints caused by high temperature during soldering of BGA components are also becoming more and more serious, so low-temperature soldering becomes a trend. Solders commonly used in the lead-free soldering of the prior art mainly include SnAgCu-based (especially SAC305) solders, but SnAgCu-based solders have a relatively high melting point (217° C.-230° C.) and a reflow soldering temperature of more than 240° C., and therefore are not suitable for low-temperature soldering.

Lead-free low-temperature soldering materials for low-temperature soldering (with a soldering temperature equal to or lower than 200° C.) field in the prior art mainly include system solders such as SnBi-based alloys, SnZn-based alloys and SnIn-based alloys. The problem with SnIn-based alloy solders is that the alloy solders are expensive due to the scarcity of indium; Zn in SnZn-based alloy solders is also susceptible to oxidation; and these disadvantages limit the application of the system solders including SnZn-based alloys and SnIn-based alloys in low-temperature soldering. Among the SnBi-based alloy solders, soldering materials made of SnBi58 eutectic alloys are more widely used, but the problems with such solders are that: Sn is combined with a copper substrate, Bi does not react with Cu, and then Sn in the eutectic structure is continuously diffused to the copper substrate, resulting in a decrease in the relative amount of Sn and an increase in the relative amount of Bi in soldered joint regions to form a Bi-rich layer. The Bi-rich layers in soldered joints become the weakest areas of the entire solder joints, which seriously affects the reliability of the soldered joints.

To eliminate or reduce the Bi-rich layers in soldered joints formed by soldering with SnBi-based alloy soldering solders, improvement is mostly made by microalloying in the prior art, i.e. a trace amount of metals such as Ni, Cu, Ag, Zn, Sb and rare earth elements are added to an SnBi alloy, and an intermetallic compound that can form a "separator effect" with the metal Sn in the solder refines crystal grains and slows down the formation of a Bi-rich layer, but since such microalloyed SnBi crystal still has a dendritic SnBi eutectic, the microalloyed SnBi soldering solder can only improve the local soldering performance and can not greatly improve the comprehensive performance, and with the progress of aging, Sn in the SnBi eutectic structure is still continuously diffused to a copper substrate, resulting in a decrease in the Sn content in the SnBi eutectic structure, so that the growth of a Bi-rich layer cannot be avoided and the reliability of the soldered joints is rarely improved. Nowadays, for the development of the microelectronic technology, there is an urgent need for providing a low-temperature lead-free soldering solder that is inexpensive, has good oxidation resistance and does not produce a Bi-rich layer.

Explanation of Related Terms 1. low-temperature soldering refers to soldering of an electronic component at a soldering temperature of 200° C. or less;
2. the low melting point of low-melting-point SnBi-based alloy solder powder means that the melting point of the alloy solder powder is 100° C.-180° C.;
3. the melting point of micro/nanoparticle-reinforced tin-based alloy solder powder is 200-300° C.;
4. the SEM in an SEM image is referred to as a scanning electron microscope;
5. in the application document of the invention, symbols such as T3-T8 denote the diameter range of particles; wherein T3 denotes a particle diameter range of 25-45 μm, T4 denotes a particle diameter range of 20-38 μm, T5 denotes a particle diameter range of 15-25 μm, T6 denotes a particle diameter range of 5-15 μm, T7 denotes a particle diameter range of 2-11 μm and T8 denotes a particle diameter range of 2-8 μm;
6. the term "alloy" used in the patent application document of the invention refers to a solid product with metallic properties obtained by mixing one metal with another or more metals or nonmetals followed by melting, cooling and solidification; and
7. A molten salt, also known as a heat-conducting molten salt and a heat medium, is a heat-conducting medium formed by melting of salts, which has the advantages of larger specific heat capacity and thermal conductivity, low viscosity, good stability, high decomposition voltage, low vapor pressure and low cost, and covers the surface of a liquid metal in alloy smelting to avoid oxidation.

SUMMARY OF THE INVENTION

A technical problem to be solved by the invention is to provide a micro/nanoparticle-reinforced composite solder for low-temperature soldering which can effectively the growth of a Bi-rich layer and a preparation method thereof as well as a method for preparing micro/nanoparticle-reinforced tin-based alloy solder powder of the composite solder so as to avoid the disadvantage that a soldered joint formed of a SnBi-based alloy soldering solder in the prior art by low-temperature soldering is prone to form a Bi-rich layer which affects the reliability of the soldered joint.

The technical solution adopted in the invention to solve the above technical problem is a micro/nanoparticle-reinforced composite solder for low-temperature soldering, which comprises the following components by mass percentage: 50-80% of low-melting-point SnBi-based alloy solder powder; 10-40% of micro/nanoparticle-reinforced tin-based alloy solder powder which is an alloy powder formed by diffusely mixing one or two of micro/nano-sized Cu, Ag and Sb particles with a molten metal Sn and atomizing the mixture; and a balance amount of a flux.

The micro/nanoparticle-reinforced composite solder comprises the following components by mass percentage: 60-70% of low-melting-point SnBi-based alloy solder powder, 10-30% of micro/nanoparticle-reinforced tin-based alloy solder powder, and a balance amount of a flux; wherein the low-melting-point SnBi-based alloy solder powder is low-melting-point SnBi or SnBiAg alloy solder powder; and the micro/nanoparticle-reinforced tin-based alloy solder powder is selected from any one or more of SnCu, SnAg, SnAgCu and SnSb alloy solder powder.

The micro/nanoparticle-reinforced tin-based alloy solder powder comprises any one or more of SnCu, SnAg, SnAgCu and SnSb alloy solder powder, and comprises the following components by mass percentage: any one or two of 0-3% of Cu, 0-4% of Ag and 0-10% of Sb; and a balance amount of Sn.

The SnCu alloy in the micro/nanoparticle-reinforced tin-based alloy solder powder is any one of SnCu0.7, SnCu1 and SnCu3 alloys; the SnAg alloy in the micro/nanoparticle-reinforced tin-based alloy solder powder is any one of SnAg3, SnAg3.5 and SnAg4; the SnAgCu alloy in the micro/nanoparticle-reinforced tin-based alloy solder powder is any one of SnAg0.3Cu0.7, SnAg1Cu0.5 and SnAg3Cu0.5; and the SnSb alloy in the micro/nanoparticle-reinforced tin-based alloy solder powder is any one of SnSb10 and SnSb5.

the micro/nanoparticle-reinforced tin-based alloy solder powder further comprises any one or more powder particles of 0.01-0.1% of Ni, 0.001-0.05% of Ce, 0.001-0.1% of Co, 0.1-0.9% of nanographene and 0.01-0.05% of carbon nanotubes by mass percentage.

The low-melting-point SnBi-based alloy solder powder is selected from one or more of SnBi, SnBiAg and SnBiSb solder powder; the SnBi alloy solder powder in the low-melting-point SnBi-based alloy solder powder is Sn42Bi58; the SnBiAg alloy solder powder in the low-melting-point SnBi-based alloy solder powder is any one of Sn42Bi57Ag1, Sn42Bi57.6Ag0.4, Sn64Bi35Ag1 and Sn64.7Bi35Ag0.3; and the low-melting-point SnBi-based alloy solder powder formed of any one of the SnBi, SnBiAg and SnBiSb solder powder or any mixture thereof comprises the following metals by mass percentage: 0-1% of Ag, 0-3% of Sb, 35-58% of Bi and a balance amount of Sn.

The technical solution adopted in the invention to solve the above technical problem further comprises a preparation method of micro/nanoparticle-reinforced tin-based alloy solder powder for making a low-temperature soldering composite solder, which comprises the steps of: step A1: heating a metal Sn to 345-355° C. to melt into a liquid metal Sn; step A2: adding micro/nano-sized metal particles to the liquid metal Sn obtained in the step A1, wherein the micro/nano-sized metal particles comprise any one or two of Cu, Ag and Sb; step A3: adding an antioxidant to the liquid metal mixture obtained in the step A2, and extracting residual air in the space containing the liquid metal mixture to a negative pressure state; step A4: keeping the liquid metal mixture prepared in the step A3 in a negative-pressure sealed state at 345-355° C., and dispersing the mixture by a high-power ultrasonic or mechanical approach for 30-90 min so that the micro/nano-sized metal particles are fully diffusely distributed therein to become a micro/nanoparticle-reinforced tin-based liquid metal having highly dispersed micro/nano-sized metal particles; and step A5: delivering the tin-based liquid metal with a temperature of 345-355° C. dispersed in the step A4 to an atomization chamber for atomization, dispersion and forming, controlling the working condition of the atomization chamber at a temperature of 0-50° C., and controlling the oxygen content in the environment of the atomization chamber at 400-2000 ppm; wherein atomization approaches used by the atomization chamber include ultrasonic atomization, centrifugal atomization or gas atomization; and the atomized, dispersed and formed tin-based liquid metal is rapidly cooled to become fine metal particles, i.e. micro/nanoparticle-reinforced tin-based alloy solder powder.

In the preparation method of micro/nanoparticle-reinforced tin-based alloy solder powder, the micro/nano-sized metal particles added in the step A2 have a diameter ranging from 30 nm to 8 μm or 100 nm to 1 μm or 1 μm to 5 μm; and in the step A3, an antioxidant is added and then residual air in the space containing the liquid metal mixture is extracted to −0.1 Mpa, and the negative pressure is maintained throughout the step A4.

In the preparation method of micro/nanoparticle-reinforced tin-based alloy solder powder, the micro/nano-sized metal particles added in the step A2 comprise any one or two of Cu, Ag and Sb, and comprise the following components by mass percentage: 0-3% of Cu, 0-4% of Ag and 0-10% of Sb, which are then mixed to form a liquid micro/nanoparticle-reinforced tin-based metal, and the molten tin-based metal includes liquid SnCu, SnSb, SnAg and SnAgCu alloys. In the preparation method of micro/nanoparticle-reinforced tin-based alloy solder powder, the micro/nanoparticles added in the step A2 further comprise any one or more particles of 0.01-0.1% of Ni, 0.001-0.05% of Ce, 0.001-0.1% of Co, 0.1-0.9% of nanographene and 0.01-0.05% of carbon nanotubes by mass percentage.

In the preparation method of micro/nanoparticle-reinforced tin-based alloy solder powder, the antioxidant added in the step A3 includes rosin or a molten LiCl—KCl salt; in the step A4, the micro/nanoparticles are subjected to high-power ultrasonic dispersion, the conditions of which to reinforce the tin-based alloy solder powder are as follows: the ultrasonic frequency is 10 kHz-30 kHz and the power is 1 kW-10 kW; in the step A4, the micro/nanoparticles are subjected to mechanical dispersion, the condition of which to reinforce the tin-based alloy solder powder is as follows: the linear velocity of a high-speed rotary dispersing paddle is 10 m/s-100 m/s; and, in addition, the preparation method of the reinforced tin-based alloy solder powder further comprises step A6: subjecting the micro/nanoparticle-reinforced tin-based alloy solder powder prepared in the step A5 to mechanical sieving or air jet sieving to obtain granular powder with different particle diameter specifications, and then preparing the powder into micro/nanoparticle-reinforced tin-based alloy solder powder with size specifications of T3-T8 for use.

The technical solution adopted in the invention to solve the above technical problem further comprises a preparation method of a micro/nanoparticle-reinforced composite solder for low-temperature soldering, which comprises the steps of: step B: by mass percentage, weighing 10-40% of the micro/nanoparticle-reinforced tin-based alloy solder powder prepared by the preparation method of micro/nanoparticle-reinforced tin-based alloy solder powder according to any one of claims 7 to 11, and then weighing 50-80% of low-melting-point SnBi-based alloy solder powder and 8-15% of a flux respectively; and step C: mechanically evenly stirring the components weighed in the step B at room temperature to prepare a micro/nanoparticle-reinforced composite solder for low-temperature soldering.

The technical solution adopted in the invention to solve the above technical problem further comprises a soldered joint or seam formed by soldering with the micro/nanoparticle-reinforced composite solder, wherein the soldered joint or seam is a connecting material with electrical conductivity, thermal conductivity and mechanical strength between an electronic component and a substrate on which the electronic component is mounted; the soldered joint or seam is soldered by a reflow or hot-melt process; the solder forms used in the reflow or hot-melt soldering include solder paste, preformed solder tabs, solder strips or solder wires consisting of a micro/nanoparticle-reinforced composite solder; the heating temperature for the reflow or hot-melt soldering is set as follows: the peak soldering temperature is not more than 200° C., the time for a temperature of above 140° C. is not less than 4 min and the time for a temperature of above 180° C. is not less than 2 min; the metal crystal of the soldered joint or seam formed by soldering has an isotropic structure and is in the form of a mesh or a dimple, and has no dendritic SnBi eutectic; and the soldered joint or seam alloy comprises 19.4-51.2% of Bi, 0.01-1.3% of Cu, 0.01-1.8% of Ag, 0.01-0.6% of Sb, 0-0.05% of Ni, 0-0.02% of Ce, 0-0.04% of Co, 0-0.36% of nanographene and 0-0.02% of carbon nanotubes as well as a balance amount of Sn and a small amount of inevitable substrate alloying elements by mass percentage.

Compared with the prior art, the invention has the following beneficial effects: 1. for the micro/nanoparticle-reinforced composite solder prepared from the components by the preparation method of the invention, a low-melting-point alloy is first melted in fusion soldering, micro/nanoparticle-reinforced tin-based alloy powder is then dissolved and infiltrated by heat mass transfer to enable the micro/nanoparticle-reinforced tin-based alloy to precipitate β-Sn phases, and since the Sn content in the tin-based alloy is more than 85% and the Sn content in the low-melting-point alloy is less than 70%, the β-Sn phases in the high-melting-point tin-based alloy are relatively sufficient, and therefore very easily combined with a copper soldering pan in low-temperature soldering, thus such micro/nanoparticle-reinforced tin-based alloy solder powder is suitable for formulating a low-temperature soldering composite solder; 2. the composite solder for low-temperature soldering prepared by the preparation method and the formulation of the invention comprises micro/nanoparticle-reinforced tin-based alloy solder powder, and the β-Sn phases precipitated from the micro/nanoparticle-reinforced tin-based alloy in the low-temperature soldering composite solder are very easily combined with the copper soldering pan during soldering, which greatly reduces the probability of diffusion of Sn in an SnBi eutectic structure of the composite solder to a copper substrate, so that Sn in the SnBi eutectic structure can also maintain good bonding with Bi atoms, thereby reducing the probability of precipitation and accumulation of Bi to form a Bi-rich layer; and micro/nanoparticles are dispersed in the composite solder as nucleation particles for refining crystal grains and can play a "separator effect" during a certain aging period, thereby inhibiting Bi in the low-melting-point SnBi eutectic alloy of the composite solder from enrichment and growth, slowing down the growth of an intermetallic compound and improving the reliability of soldered joints; and 3. for soldered joints or seams which are formed after low-temperature soldering with the low-temperature soldering composite solder prepared from the components by the preparation method of the invention, the β-Sn phases in the composite solder are well combined with the copper soldering pan, and the micro/nanoparticles are dispersed in the solder as nucleation particles for refining crystal grains and can play a "separator effect" during a certain aging period, which further reduces the probability of precipitation and accumulation of Bi in the SnBi eutectic structure to form a Bi-rich layer; and the metal crystal of the soldered joints or seams has an isotropic structure and is in the form of a mesh or a dimple, and has no dendritic SnBi eutectic structure, which greatly improves the reliability of the soldered joints and seams after soldering, thus the composite solder is very suitable for use in fine-pitch micro-soldered joints, meets the development trend of miniaturization, light weight, softness and multi-functional high integration of electronic packaging components, and has great application value and development prospects.

DETAILED DESCRIPTION OF THE INVENTION

Figure 1:
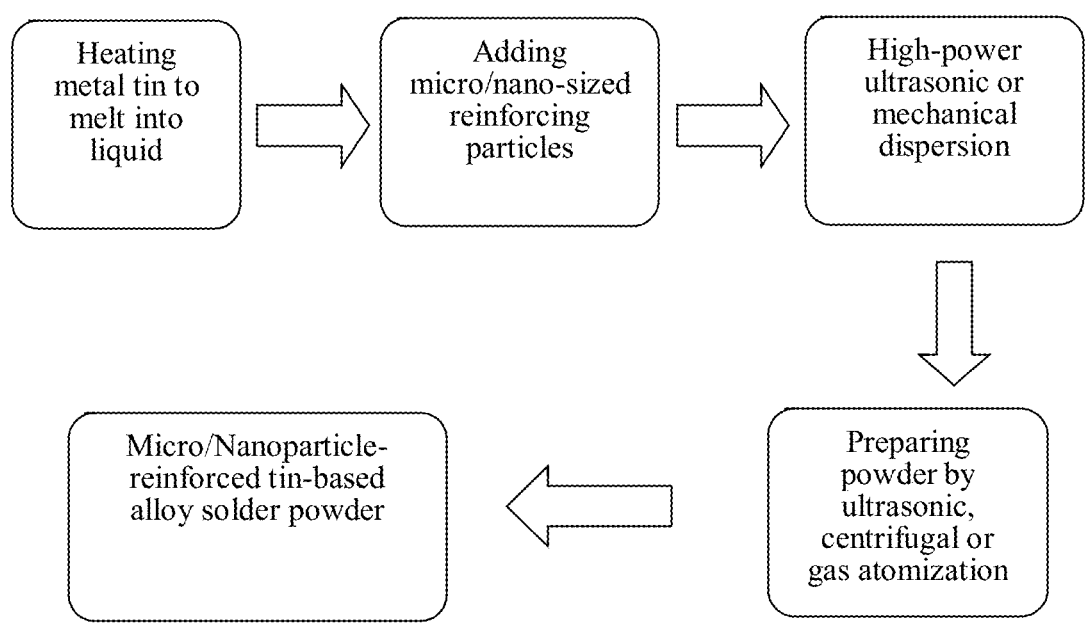
FIG. 1 is a schematic flow chart of a preferred embodiment of a preparation method of micro/nanoparticle-reinforced tin-based alloy solder powder in the invention.

The invention will be further described below with reference to the examples. These examples are part of the preferred embodiments of the invention, but the claims of the invention are not limited by these examples.

Some examples of a micro/nanoparticle-reinforced composite solder for low-temperature soldering comprise the following components by mass percentage: 50-80% of low-melting-point SnBi-based alloy solder powder, wherein the low melting point of the low-melting-point alloy solder powder means that its melting temperature is 100-180° C.; 10-40% of micro/nanoparticle-reinforced tin-based alloy solder powder, wherein the tin-based alloy solder powder has a melting temperature of 200-300° C.; and a balance amount of a flux, the proportion of which is 8-15%. The micro/nanoparticle-reinforced composite solder for low-temperature soldering may further comprise the following components by mass percentage: 60-70% of low-melting-point SnBi-based alloy solder powder which is low-melting-point SnBi or SnBiAg alloy solder powder; 10-30% of micro/nanoparticle-reinforced tin-based alloy solder powder which comprises SnCu, SnAg, SnSb or SnAgCu alloy powder; and a balance amount of a flux.

In the examples of the micro/nanoparticle-reinforced composite solder for low-temperature soldering, the proportion of the low-melting-point SnBi-based alloy solder powder is greater than 50%; if the mass percentage of the low-melting-point SnBi-based alloy solder powder is less than 50%, it is impossible to melt and wet the micro/nanoparticle-reinforced tin-based alloy solder powder, which increases the risks of voids and cold solder joints, or the micro/nanoparticle-reinforced tin-based alloy solder powder is melted at a very slow rate, which affects the reaction between β-Sn phases in the micro/nanoparticle-reinforced tin-based alloy and a copper substrate; and if the mass percentage of the low-melting-point SnBi-based alloy solder powder is higher than 80%, the amount of the micro/nanoparticle-reinforced tin-based alloy solder powder added is too small, and the improved strength of the resulting soldered joint is not obvious. The mixing ratio in the invention is the best implementation range obtained through many experiments and inductive analysis as well as progressive R&D. In particular, a formulation comprising 60-70% of low-melting-point SnBi-based alloy solder powder which is low-melting-point SnBi or SnBiAg alloy solder powder, 10-30% of micro/nanoparticle-reinforced tin-based alloy solder powder, and a balance amount of a flux, is especially suitable for low-temperature soldering, wherein soldered joints and seams have high reliability after soldering.

A soldered joint or seam formed by soldering with the composite solder soldering is a connecting material with electrical conductivity, thermal conductivity and mechanical strength between an electronic component and a substrate; the soldered joint or seam is formed by reflow or hot-melt soldering; the solder forms used in the reflow or hot-melt soldering include solder paste, preformed solder tabs, solder strips or solder wires consisting of a micro/nanoparticle-reinforced composite solder; the heating temperature for the reflow or hot-melt soldering is set as follows: the peak soldering temperature is not more than 200° C., the time for a temperature of above 140° C. is not less than 4 min and the time for a temperature of above 180° C. is not less than 2 min; the metal crystal of the soldered joint or seam formed by soldering has an isotropic structure and is in the form of a mesh or a dimple, and has no dendritic SnBi eutectic; and the soldered joint or seam alloy comprises 19.4-51.2% of Bi, 0.01-1.3% of Cu, 0.01-1.8% of Ag, 0.01-0.6% of Sb, 0-0.05% of Ni, 0-0.02% of Ce, 0-0.04% of Co, 0-0.36% of nanographene and 0-0.02% of carbon nanotubes as well as a balance amount of Sn and a small amount of inevitable substrate alloying elements by mass percentage. The soldered joint or seam has good reliability after low-temperature soldering, and the soldered joint has greatly reduced embrittlement and very high reliability.

In the examples of the composite solder, the low-melting-point SnBi-based alloy solder powder is selected from one or more of SnBi, SnBiAg and SnBiSb solder powder; the SnBi alloy solder powder in the low-melting-point SnBi-based alloy solder powder comprises Sn42Bi58; the SnBiAg alloy solder powder in the low-melting-point SnBi-based alloy solder powder comprises any one of Sn42Bi57Ag1, Sn42Bi57.6Ag0.4, Sn64Bi35Ag1 and Sn64.7Bi35Ag0.3; and the low-melting-point SnBi-based alloy solder powder formed of any one of the SnBi, SnBiAg and SnBiSb solder powder or any mixture thereof comprises the following metals by mass percentage: 0-1% of Ag, 0-3% of Sb, 35-58% of Bi and a balance amount of Sn.

The micro/nanoparticle-reinforced tin-based alloy solder powder includes SnCu, SnAg, SnSb and SnAgCu solder powder, and comprises the following components by mass percentage: 0-3% of Cu, 0-4% of Ag and 0-10% of Sb; and a balance amount of Sn.

The SnCu alloy in the micro/nanoparticle-reinforced tin-based alloy solder powder comprises any one of SnCu0.7, SnCu1 and SnCu3 alloys; the SnAg alloy in the micro/nanoparticle-reinforced tin-based alloy solder powder comprises any one of SnAg3, SnAg3.5 and SnAg4; the SnAgCu alloy in the micro/nanoparticle-reinforced tin-based alloy solder powder comprises any one of SnAg0.3Cu0.7, SnAg1Cu0.5 and SnAg3Cu0.5; and the SnSb alloy in the micro/nanoparticle-reinforced tin-based alloy solder powder comprises any one of SnSb10 and SnSb5.

The micro/nanoparticle-reinforced tin-based alloy solder powder further comprises any one or more powder particles of 0.01-0.1% of Ni, 0.001-0.05% of Ce, 0.001-0.1% of Co, 0.1-0.9% of nanographene and 0.01-0.05% of carbon nanotubes by mass percentage. If some oxidizing conditions are well controlled, 0.001-2.5% of Zn may also be added to the components.

A preparation method of micro/nanoparticle-reinforced tin-based alloy solder powder for making a composite solder for low-temperature soldering comprises the steps of:

step A1: heating a metal Sn to 345-355° C. to melt into a liquid metal Sn;

step A2: adding micro/nano-sized metal particles to the liquid metal Sn obtained in the step A1; the micro/nano-sized metal particles comprising any one or two of Cu, Ag and Sb;

step A3: adding an antioxidant to the liquid metal mixture obtained in the step A2, and extracting residual air in the space containing the liquid metal mixture to a negative pressure state;

step A4: keeping the liquid metal mixture prepared in the step A3 in a negative-pressure sealed state at 345-355° C., and dispersing the mixture by a high-power ultrasonic or mechanical approach for 30-90 min so that the micro/nano-sized metal particles are fully diffusely distributed therein to become a micro/nanoparticle-reinforced tin-based liquid metal having highly dispersed micro/nano-sized metal particles; and step A5: delivering the tin-based liquid metal with a temperature of 345-355° C. dispersed in the step A4 to an atomization chamber for atomization, dispersion and forming, controlling the working condition of the atomization chamber at a temperature of 0-50° C., and controlling the oxygen content in the environment of the atomization chamber at 400-2000 ppm; wherein atomization approaches used by the atomization chamber include ultrasonic atomization, centrifugal atomization or gas atomization; and the atomized, dispersed and formed tin-based liquid metal is rapidly cooled to become fine metal particles, i.e. micro/nanoparticle-reinforced tin-based alloy solder powder.

The micro/nano-sized metal particles added in the step A2 have a diameter ranging from 30 nm to 8 μm or 100 nm to 1 μm or 1 μm to 5 μm; and in the step A3, an antioxidant is added and then residual air in the space containing the liquid metal mixture is extracted to −0.1 Mpa, and the negative pressure is maintained throughout the step A4.

The micro/nano-sized metal particles added in the step A2 comprise any one or two of Cu, Ag and Sb, and comprise the following components by mass percentage: 0-3% of Cu, 0-4% of Ag and 0-10% of Sb, which are then mixed to form a liquid micro/nanoparticle-reinforced tin-based metal, and the molten tin-based metal includes liquid SnCu, SnSb, SnAg and SnAgCu alloys. The micro/nanoparticles added in the step A2 further comprise any one or more particles of 0.01-0.1% of Ni, 0.001-0.05% of Ce, 0.001-0.1% of Co, 0.1-0.9% of nanographene and 0.01-0.05% of carbon nanotubes by mass percentage.

The antioxidant added in the step A3 includes rosin or a molten LiCl—KCl salt; in the step A4, the micro/nanoparticles are subjected to high-power ultrasonic dispersion, the conditions of which to reinforce the tin-based alloy solder powder are as follows: the ultrasonic frequency is 10 kHz-30 kHz and the power is 1 kW-10 kW; and, in the step A4, the micro/nanoparticles are subjected to mechanical dispersion, the condition of which to reinforce the tin-based alloy solder powder is as follows: the linear velocity of a high-speed rotary dispersing paddle is 10 m/s-100 m/s.

In addition, the preparation method of the reinforced tin-based alloy solder powder further comprises step A6: subjecting the micro/nanoparticle-reinforced tin-based alloy solder powder prepared in the step A5 to mechanical sieving or air jet sieving to obtain granular powder with different particle diameter specifications, and then preparing the powder into micro/nanoparticle-reinforced tin-based alloy solder powder with size specifications of T3-T8 for use.

A preparation method of a micro/nanoparticle-reinforced composite solder for low-temperature soldering comprises the steps of: step B: by mass percentage, weighing 10-40% of the micro/nanoparticle-reinforced tin-based alloy solder powder prepared by the preparation method of micro/nanoparticle-reinforced tin-based alloy solder powder, and then weighing 50-80% of low-melting-point SnBi-based alloy solder powder and 8-15% of a flux respectively; and step C: mechanically evenly stirring the components weighed in the step B at room temperature to prepare a micro/nanoparticle-reinforced composite solder for low-temperature soldering.

Step A may also be included before the step B, i.e. a step of preparing micro/nanoparticle-reinforced tin-based alloy solder powder. In this step, micro/nanoparticle-reinforced tin-based alloy solder powder is prepared by the preparation method of micro/nanoparticle-reinforced tin-based alloy solder powder.

The invention relates to a micro/nanoparticle-reinforced composite solder for low-temperature soldering and a preparation method thereof. The micro/nanoparticle-reinforced composite solder is formed by blending low-melting-point (a melting point of 100-180° C.) SnBi-based alloy solder powder with micro/nanoparticle-reinforced tin-based alloy solder powder and a conventional flux. The tin-based alloy solder powder is formed by highly diffusely distributing micro/nanoparticles in a molten metal Sn and atomizing the mixture. During soldering, Sn in the micro/nanoparticle-reinforced tin-based alloy solder powder is combined with Cu in a copper substrate in preference to Sn in an SnBi eutectic structure, thereby inhibiting the diffusion of Sn in the SnBi eutectic structure of the low-melting-point SnBi alloy solder powder; and micro/nano-sized reinforcing metal particles block Bi atoms in the SnBi eutectic structure from escape, segregation, crystallization and growth, thereby refining the structure, enhancing the performance and significantly improving the reliability of soldered joints.

As shown in Table 1, fifteen different formulations of Examples 1 to 15 are listed in total. Preparation method of a composite solder of Example 1: firstly, micro/nanoparticle-reinforced tin-based alloy solder powder was prepared as follows: 97 parts of Sn were weighed by mass percentage, added to a tin melting furnace and heated to 350° C. until Sn was fully melted and then continuous stirred, an antioxidant was added, 3 parts of micro/nano-sized copper powder were added, and the mixture was dispersed for 30 min under vacuum stirring by a high-speed mechanical disperser at a paddle linear velocity of 50 m/s; then the metal liquid was ultrasonically atomized at a frequency of 48 kHz, and mechanically sieved to prepare micro/nanoparticle-reinforced tin-based alloy solder powder with particle diameter specifications of T3-T8, which was packaged for use; and a composite solder was prepared as follows: 10 parts of the micro/nanoparticle-reinforced tin-based alloy solder powder with a specification of T4 prepared in the above step, 80 parts of SnBi58 low-melting-point alloy solder powder with a specification of T3 and 10 parts of a conventional rosin-based flux were respectively weighed, placed in a solder paste jar, stirred at a rate of 200 r/min for 15 min, then taken out, and cooled to room temperature to prepare a micro/nanoparticle-reinforced lead-free composite solder.

The preparation process of composite solders of Examples 2 to 5 was the same as that of Example 1, except that different mixing ratios were used in the preparation of the solders, wherein the mixing ratio of low-melting-point alloy solder powder, i.e. SnBi58 powder to micro/nanoparticle-reinforced tin-based alloy solder powder was 70/20, 65/25, 60/30 and 50/40 respectively, and a balance amount of a rosin-based flux was used; and the particle diameter of the SnBi58 powder in Examples 2 to 5 was the same that in Example 1. Stirring preparation processes of Examples 2 to 5 were the same as in Example 1.

A composite solder of Example 6 was different from that of Example 1 in that: micro/nanoparticle-reinforced tin-based alloy powder comprising Sn/Ag/Cu in a ratio of 99/0.3/0.7 was used, and the micro/nanoparticle-reinforced tin-based alloy powder used has a different particle diameter, i.e. powder with a specification of T6 was used instead; in Example 6, the mass percentage of SnBi58 powder was 66%, the mass percentage of the tin-based alloy solder powder was 20% and the mass percentage of a flux was 14%; and a preparation process of the composite solder was the same as in Example 1.

Preparation methods of micro/nanoparticle-reinforced tin-based alloy solder powder of composite solders of Examples 7 to 10 were different from the preparation method of Example 1 in that: micro/nanoparticle-reinforced tin-based alloy powder comprising Sn/Ag in a ratio of 96.5/3.5 was used. In the preparation of the composite solders, the micro/nanoparticle-reinforced tin-based alloy solder powder and low-melting-point alloy solder powder used in Examples 7 to 10 had a particle diameter of T4; in Examples 7 to 10, the mass percentage of the micro/nanoparticle-reinforced tin-based SnAg3.5 alloy solder powder was 15%, 25%, 30% and 35% respectively; in Examples 7 to 10, the low-melting-point alloy solder powder used comprised SnBi35Ag0.3 with a mass percentage of 75%, 55%, 30% and 15% respectively; the low-melting-point alloy solder powder used in Examples 8 to 10 further comprised SnBi58 with a mass percentage of 10%, 20% and 30% respectively; the low-melting-point alloy solder powder used in Example 10 further comprised SnBi57Sb1 with a mass percentage of 10%; in Examples 7 to 10, the mass percentage of conventional rosin-based fluxes was 10%; and preparation processes of the composite solders were the same as in Example 1.

Preparation method of a composite solder of Example 11: firstly, micro/nanoparticle-reinforced tin-based alloy solder powder was prepared as follows: 90 parts of Sn were weighed by mass percentage, added to a tin melting furnace and heated to 350° C. until Sn was fully melted and then continuous stirred, an antioxidant was added, 10 parts of micro/nano-sized antimony powder were added, and the mixture was ultrasonically dispersed for 1 h by a high-power ultrasonic disperser at an ultrasonic frequency of 20 kHz and a power 1 kW; and then the metal liquid was prepared into powder by centrifugal atomization, and the powder was mechanically sieved to prepare micro/nanoparticle-reinforced tin-based alloy solder powder with particle diameter specifications of T3-T8, which was packaged for use. A composite solder was prepared as follows: 20% of micro/nanoparticle-reinforced tin-based alloy solder powder SnSb10 with a particle diameter specification of T3, 70% of low-melting-point alloy solder powder SnBi35Ag0.3 with a particle diameter specification of T4 and 10% of a rosin-free flux were respectively weighed, placed in a solder paste jar, stirred at 100 r/min for 30 min, then taken out and cooled to room temperature for use.

The specific process of composite solders of Examples 11 to 15 was the same as that of Example 10, except that the following components SnCu0.5Ni0.05, SnAg1Ni0.05Ce0.006Co0.01, SnCu0.7-nanographene 0.3 and SnAg1Cu0.5-carbon nanotube 0.02 were respectively used in the preparation of micro/nanoparticle-reinforced tin-based alloy solder powder, and micro/nanoparticle-reinforced tin-based alloy solder powder with a specification of T3 was used after forming; formulations for preparing the composite solders of Examples 11 to 12 comprised 70% of SnBi35Ag0.3 with a particle diameter specification of T4 and 10% of a rosin-free flux; and the formulations for preparing the composite solders of Examples 11 to 12 respectively comprised 20% of SnCu0.5Ni0.05 with a particle diameter specification of T3 and 20% of SnAg1Ni0.05Ce0.006Co0.01 with a particle diameter specification of T3 as the micro/nanoparticle-reinforced tin-based alloy solder powder. Formulations for preparing the composite solders of Examples 14 to 15 comprised 70% of SnBi57Sb1 with a particle diameter specification of T4 and 10% of a rosin-free flux; and the formulations for preparing the composite solders of Examples 14 to 15 respectively comprised 20% of SnCu0.7-nanographene 0.3 with a particle diameter specification of T3 and 20% of SnAg1Cu0.5-carbon nanotube 0.02 with a particle diameter specification of T3 as the micro/nanoparticle-reinforced tin-based alloy solder powder.

Preparation method of a composite solder of Comparative Example 1: the composite solder was formed directly by blending low-melting-point SnBi-based alloy solder powder with a flux; and 90 parts of SnBi58 alloy solder powder with a specification of T3 and 10 parts of a conventional rosin-based flux by mass percentage were stirred on a solder paste mixer at 200 r/min for 15 min, then taken out and cooled to room temperature for use.

Preparation method of a composite solder of Comparative Example 2: the composite solder was formed directly by blending low-melting-point SnBiAg-based alloy solder powder with a flux; and 90 parts of SnBi35Ag0.3 alloy solder powder with a specification of T3 and 10 parts of a conventional rosin-based flux by mass percentage were stirred on a solder paste mixer at 200 r/min for 15 min, then taken out and cooled to room temperature for use.

Preparation method of a composite solder of Comparative Example 3: the composite solder was formed directly by blending low-melting-point microalloyed SnBiSb-based alloy solder powder with a flux; and 90 parts of SnBi57Sb1 alloy solder powder with a specification of T3 and 10 parts of a conventional rosin-based flux by mass percentage were stirred on a solder paste mixer at 200 r/min for 15 min, then taken out and cooled to room temperature for use.

Preparation method of a composite solder of Comparative Example 4: the composite solder was formed directly by blending low-melting-point SnBi-based alloy solder powder and phase-reinforcing particles with a flux, and the phase-reinforcing particles were not dispersed. 85 parts of SnBi58 alloy solder powder with a specification of T4 and 5 parts of 1-5 μm copper powder by mass percentage and a conventional rosin-based flux were stirred on a solder paste mixer at 200 r/min for 15 min, then taken out and cooled to room temperature for use.

Preparation method of a composite solder of Comparative Example 5: the composite solder was formed directly by blending low-melting-point SnBi-based alloy solder powder and coarse phase-reinforcing particles with a flux. 64 parts of SnBi57Sb1 with a specification of T4, 25 parts of tin-based Sn10Cu90 alloy solder powder with a specification of T3 and 11 parts of a conventional rosin-based flux were respectively weighed by mass percentage, placed in a solder paste jar, stirred at 100 r/min for 30 min, then taken out and cooled to room temperature for use. Preparation method of a composite solder of Comparative Example 6: 90 parts of SnAgCu305 alloy solder powder with a specification of T3 and 10 parts of a conventional rosin-based flux were weighed by mass percentage, stirred on a solder paste mixer at 200 r/min for 15 min, then taken out and cooled to room temperature for use.

Preparation method of a composite solder of Comparative Example 7: the composite solder was formed by blending low-melting-point SnBi-based alloy solder powder and micro/nanoparticle-reinforced tin-based alloy solder powder with a flux; and 45 parts of SnBi35Ag0.3 with a specification of T4, 44 parts of micro/nanoparticle-reinforced tin-based Sn95Cu3 alloy solder powder with a specification of T3 and 11 parts of a conventional rosin-based flux were respectively weighed by mass percentage, placed in a solder paste jar, stirred at 200 r/min for 15 min, then taken out and cooled to room temperature for use.

The solders prepared by using the above examples and comparative examples were coated on a soldering pan for flexible LED strip lights, light beads were mounted, then the solders were placed in a reflow furnace, and the components were subjected to reflow soldering according to the reflow temperature, wherein the dimension of the LED components was 3.5*2.7*1.2 mm and the dimension of the soldering pan was 0.5*2*1 mm. Moreover, a thrust test was carried out on the shear force that could be withstood by the soldered light beads. The mixing ratio parameters and test performance result evaluation of the respective examples and comparative examples are shown in Table 1. The comparison among various performances in the comparative examples and examples in Table 1 can show that, in Examples 1 to 15 of the invention, soldering can be performed at a reflow temperature of 160-185° C., and the shear strength after soldering is more than 75 N, thus not only soldering is carried out at a lower reflow temperature, but also the service performance meets the strength requirements (the strength of the strip lights requires a shear force ≥ of 60 N). Although the solders made of conventional low-melting-point tin powder as in Comparative Examples 1, 2 and 3 have a favorable reflow temperature (160-180° C.), the shear strength after soldering is almost half of that of the composite solder of the invention, which cannot meet the application requirements; the solder directly made of phase-reinforcing pure copper particles as in Comparative Example 4, or the solder made of an SnCu90 alloy with a higher copper content as in Comparative Example 5, has an extremely low shear strength after soldering due to a minimal amount of Cu dissolved during its heating, which cannot meet the application requirements; and although the conventional SnAgCu305 solder as in Comparative Example 6 has a higher shear strength, the desired reflow soldering temperature must reach 240° C., which poses a great hidden danger to the heat resistance of the components and the substrate. In Comparative Example 7, the micro/nanoparticle-reinforced tin-based alloy solder powder of the invention is used, but due to a relatively high compounding proportion of the micro/nanoparticle-reinforced tin-based alloy solder powder, the resulting composite solder cannot be melted and wetted at a low temperature, which makes it impossible to achieve good soldering.

Figure 3:
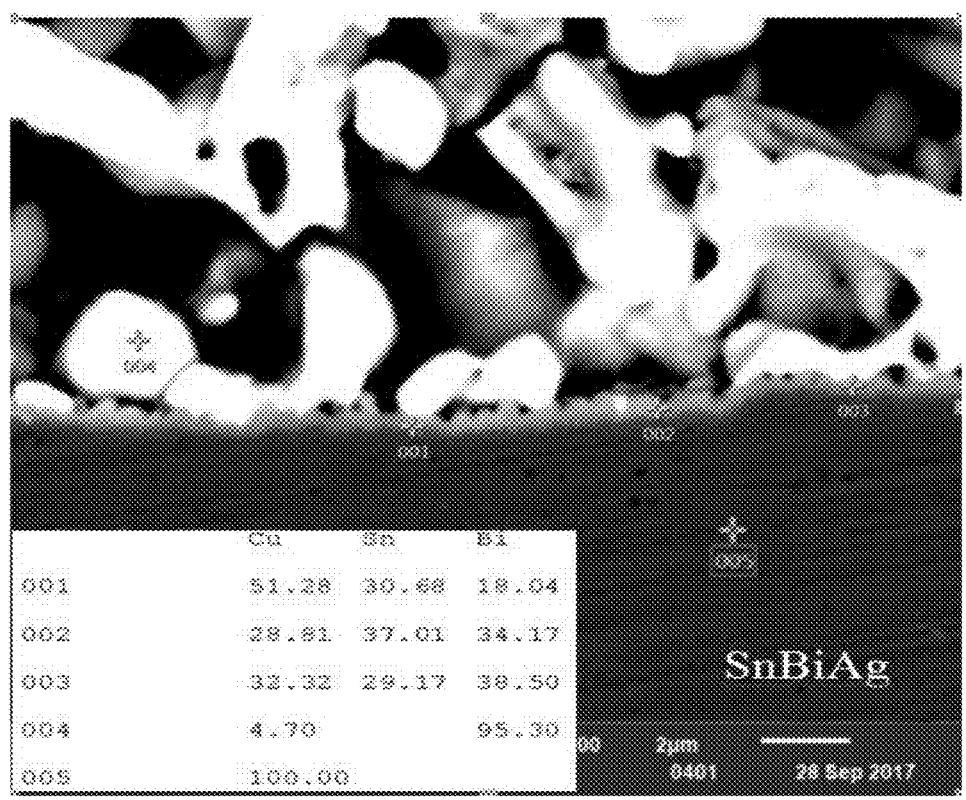
FIG. 3 is an SEM image (under 5500× magnification) of slices of soldered joints formed by soldering with an SnBiAg solder of Comparative Example 2.
Figure 5:
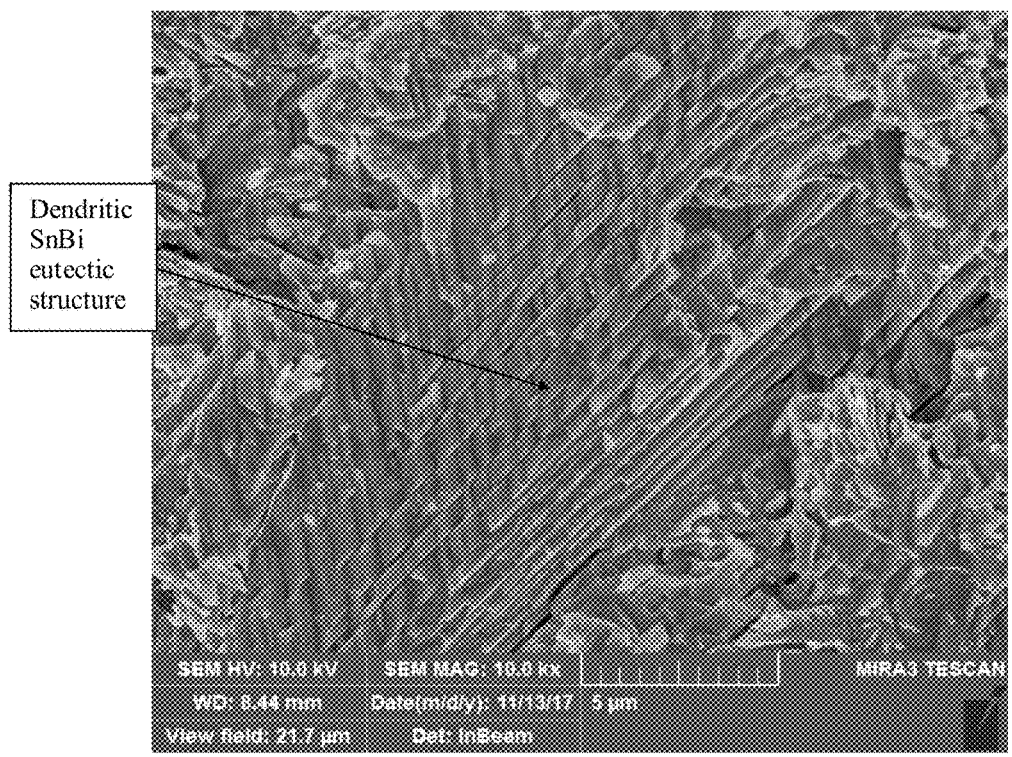
FIG. 5 is an SEM image (under 10000× magnification) of fracture surfaces of soldered joints formed by soldering with an SnBi58 eutectic solder of Comparative Example 1.
Figure 6:
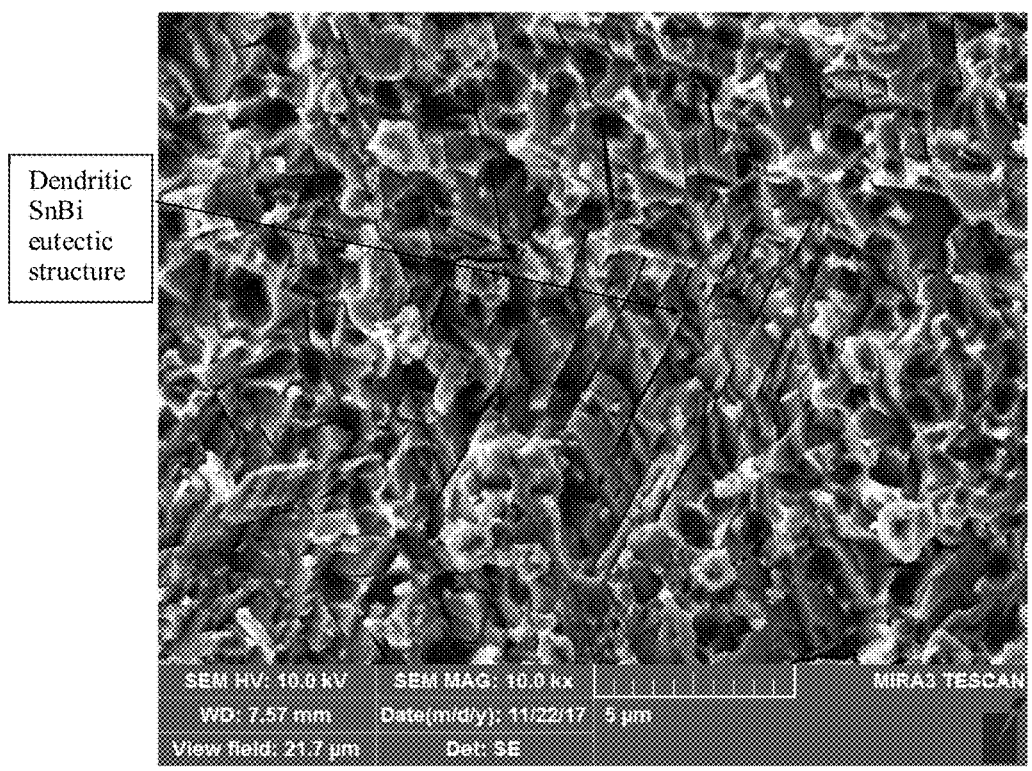
FIG. 6 is an SEM image (under 10000× magnification) of fracture surfaces of soldered joints formed by soldering with an SnBiSb solder of Comparative Example 3.
Figure 8:
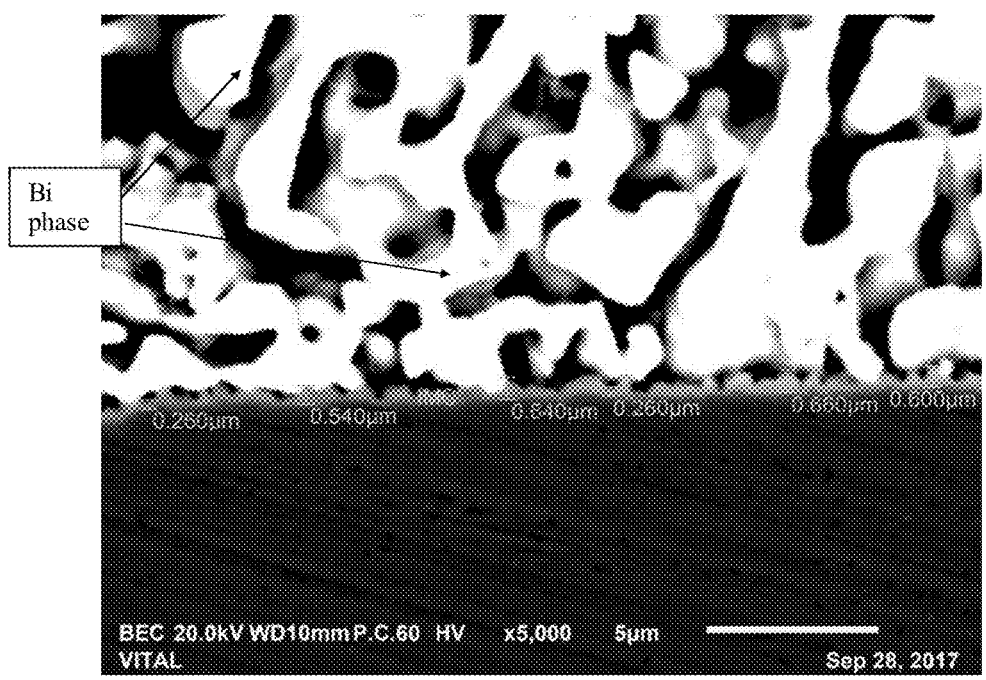
FIG. 8 is an SEM image (under 5000× magnification) of slices of the soldered joints formed by soldering with the SnBi58 eutectic solder of Comparative Example 1.

The reasons why the examples can achieve a high strength after soldering at a low soldering temperature were analyzed. Firstly, SEM images of the low-melting-point SnBi solder used in Comparative Example 1 were observed. As shown in FIGS. 5 and 8, the solder exhibits a typical dendritic SnBi eutectic structure, its fracture mode is brittle cleavage fracture, brittle Bi-rich regions appear at a copper interface of soldered joints, and the structure of the soldered joints is coarse (as shown in the white areas in the Figure), which is an anisotropic structure. The microalloyed low-melting-point alloy solder powder in Comparative Examples 1 and 3 was similarly observed. As shown in FIGS. 3 and 6, the solders are also characterized by a coarse and dendritic SnBi eutectic structure, which is the direct cause of low shear strength after soldering. Such dendritic SnBi structures in FIGS. 5 and 6 allow that the soldered joints or seams have a very brittle strength in some directions, just like a geologically fractured structure, which poses a hidden danger to the connection reliability.

Figure 4:
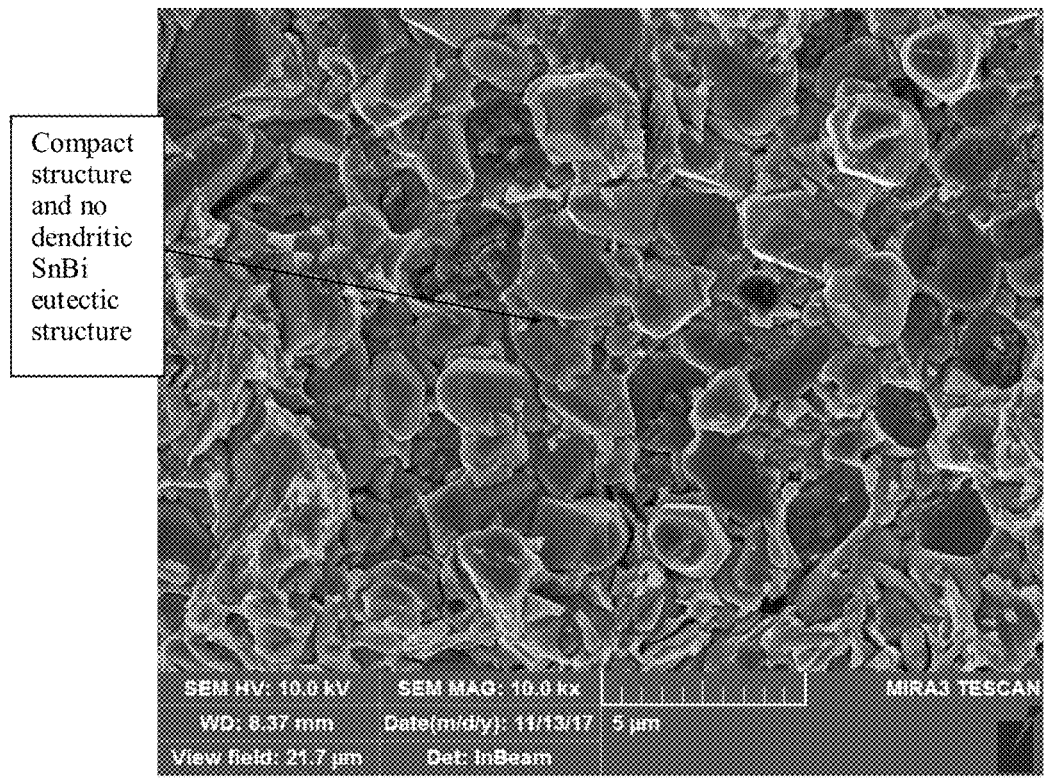
FIG. 4 is an SEM image (under 10000× magnification) of fracture surfaces of soldered joints formed by soldering with a composite solder of Example 9.
Figure 7:
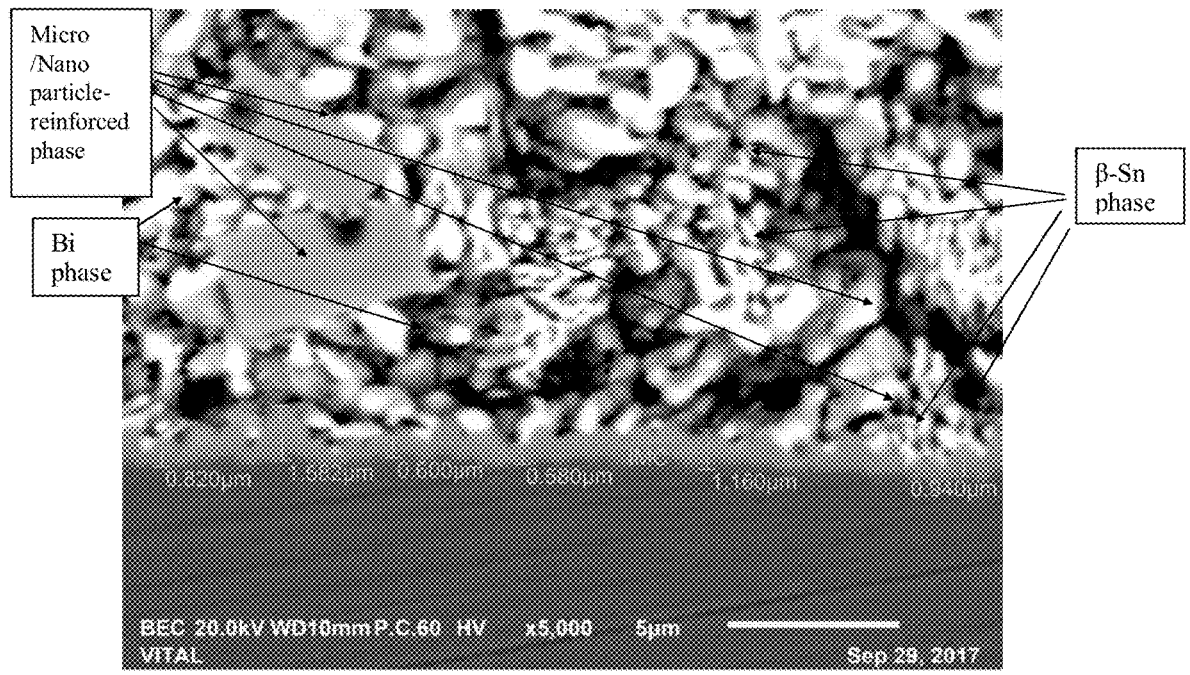
FIG. 7 is an SEM image (under 5000× magnification) of slices of soldered joints formed by soldering with a composite solder of Example 9.

SEM images of soldered joint slices of the composite solder as in Example 9 was observed. As shown in FIGS. 4 and 7, fracture surfaces of the solder are in the form of a mesh or a dimple, the solder has no dendritic SnBi eutectic structure, and soldered joints have micro/nano-sized $Ag_3Sn$ particles dispersed therein and have more β-Sn phases, indicating that it is effective to prepare Ag particle-reinforced powder by high-power ultrasonic or mechanical dispersion in the early stage, which is advantageous for inhibiting the formation of Bi-rich regions of the solder joints. It can also be seen from the Figures that the entire soldered joints have a refined structure that is an isotropic structure, and have no Bi-rich regions, which also substantially reflects the reasons why the soldered joints have high tensile and shear strength, thus proving the effectiveness of adding micro/nano-sized reinforcing particles and further demonstrating the rationality of the design of the invention. First of all, a proper mixing ratio of low-melting-point SnBi-based alloy solder powder to micro/nanoparticle-reinforced tin-based alloy solder powder can achieve a balance between their respective advantages, which can ensure not only that the soldering temperature of the composite solder is suitable for low-temperature soldering, but also that there is enough micro/nanoparticle-reinforced tin-based alloy solder powder to produce enough β-Sn phases, thus avoiding the formation of a large area of Bi-rich regions; and secondly, the preparation method of micro/nanoparticle-reinforced tin-based alloy solder powder allows that the micro/nanoparticle-reinforced tin-based alloy solder powder can be mixed into the composite solder in an optimal form and manner, so that components in the micro/nanoparticle-reinforced tin-based alloy solder powder can be fully and uniformly dispersed to reinforce the strength of the soldered joints after soldering with the composite solder.

Figure 9:
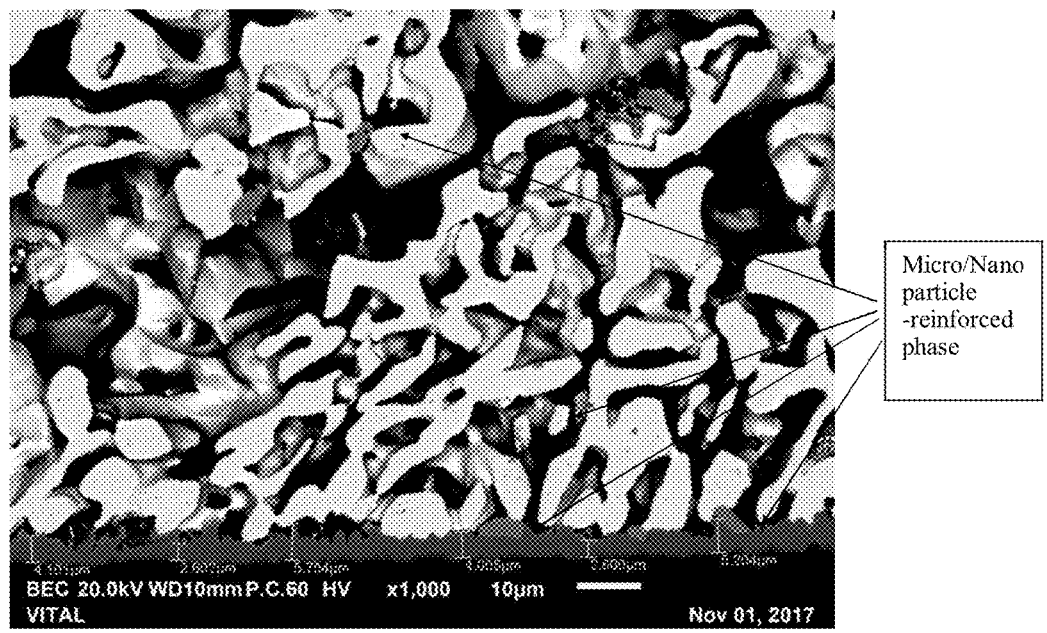
FIG. 9 is an SEM image (under 1000× magnification) of slices of soldered joints aged at 125° C. for 400 h after soldering with a composite solder of Example 3.
Figure 10:
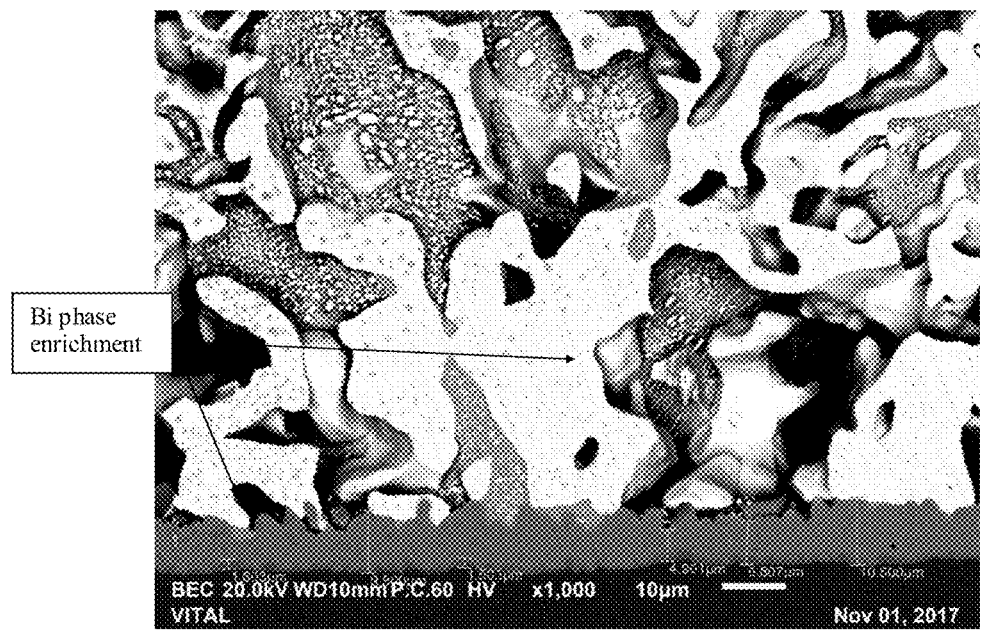
FIG. 10 is an SEM image (under 1000× magnification) of slices of the soldered joints aged at 125° C. for 400 h after soldering with the SnBi58 eutectic solder of Comparative Example 1.

Further, the aging stability of the structure of the solder after soldering was compared, wherein aging was carried out at 125° C. for 400 h. FIG. 9 shows an SEM image of the composite solder of Example 3 after soldering and aging. FIG. 10 shows an SEM image of Comparative Example 1 after aging. The comparison between FIGS. 9 and 10 can show that an intermetallic compound (IMC) of the solder of Comparative Example 1 is increased to a thickness of 10.5 um after aging while an intermetallic compound (IMC) of the composite solder has a maximum thickness of 5.7 umm after aging, which is less than 60% of the former. The comparison between FIGS. 8 and 9 can also show that Bi-rich layers have appeared between the IMC of the low-temperature SnBi solder and the solder, wherein the white structure is a Bi-rich region that is a Bi-based solid solution consisting of Bi and a small amount of Sn, and the black structure is a Sn-rich region that is an Sn-based solid solution consisting of Sn and a small amount of Bi. However, the soldered joints of the composite solder of the invention have a refined structure, and there is no Bi-rich layer between the IMC and the solder, because micro/nano-sized reinforcing metal particles are dispersed in the soldered joints and re-act as nucleation particles for crystal grains to refine the crystal grains and to play a "separator effect" during the aging period, thereby inhibiting Bi in an SnBi eutectic structure from escape, segregation, enrichment and growth under long-term heating conditions, slowing down the growth of the intermetallic compound, and ensuring the stability of the composite solder for the soldered joints in the connection of components.

Figure 2:
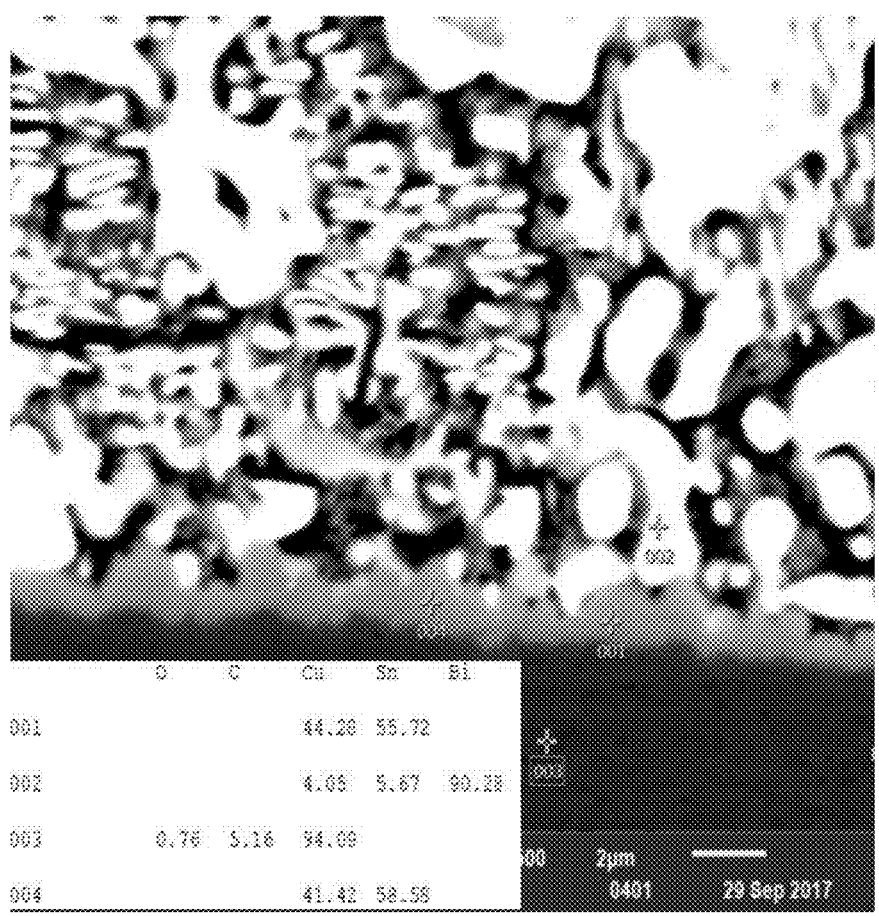
FIG. 2 is an SEM image (under 5500× magnification) of slices of soldered joints formed by soldering with a micro/nanoparticle-reinforced composite solder of Example 1.

For example, lamellar white structures in each of the crystal phase diagrams in the drawings of the invention are Bi-rich accumulation regions, and a small area of the white structures indicate that a small amount of Bi is accumulated. As shown in FIG. 2, the chemical composition of an intermetallic compound at points 001 and 004 in a solder joint interface is free of Bi, the Sn atoms necessary for the intermetallic compound in the interface are those precipitated from a micro/nanoparticle-reinforced tin-based alloy, rather than the Sn atoms in an SnBi eutectic structure. However, for the study on other composite solders, for example, the addition of elemental metal powder or a copper alloy with a high strength and a greatly different melting point not only brings about the defects of difficulty in wetting reinforcing particles and completing good soldering, but also allows that a reinforcing phase does not precipitate excess β-Sn phases, and Sn can only be precipitated from a low-melting-point SnBi-based eutectic structure to react with a copper substrate, thus Bi-rich regions are inevitably present in the alloy structure due to the lack of Sn. As shown in FIG. 2, micro/nano-sized reinforcing particles are dispersed in soldered joints and re-act as new nucleation particles for crystal grains to refine the crystal grains and form a barrier, thereby delaying the precipitation and diffusion of Sn from the SnBi eutectic structure in the soldered joints, inhibiting the growth of a Bi-rich layer and slowing down the growth of an intermetallic compound between the solder and a soldering pan during the aging period of the soldered joints. As shown in FIG. 4, the soldered joints of the composite solder have no dendritic SnBi eutectic structure shown in FIGS. 5 and 6, and a dense isotropic metallographic structure is formed, thereby reinforcing the reliability of the soldered joints, which is also the innovation of this patent.

As shown in FIG. 3, an intermetallic compound at points 001 and 002 in a solder joint interface contains Bi. In the invention, micro/nanoparticle-reinforced tin-based alloy solder powder is mixed with a low-melting-point SnBi alloy, and a high proportion of Sn atoms in the tin-based alloy is preferentially combined with Cu in a substrate, which can effectively inhibit the precipitation of Sn from the low-melting-point SnBi alloy and the formation of a Bi-rich layer, and effectively solve the problem of brittle Bi in the metal structure of soldered joints, which becomes the biggest innovation of the invention.

In summary, the composite solder of the invention can achieve low-temperature soldering at below 200° C. and has higher tensile and shear strength, and therefore is a high-quality low-temperature lead-free soldering solder with reasonable cost, good soldering reliability and good comprehensive effects. The composite solder of the invention not only solves the problem of thermal damage of a high-temperature solder to the components and the substrate, but also solves the problems of low shear strength as well as poor reliability of Bi enrichment when a low-melting-point SnBi-based alloy solder is applied. Moreover, a composite solder with a size specification of T3-T8 can be prepared by the invention, which can be suitable for the fine soldering field of fine-pitch micro-soldered joints, meets the development trend of miniaturization, light weight, softness and multi-functional high integration of electronic packaging components, and has great application value and market prospects.

The micro/nanoparticle-reinforced tin-based alloy solder powder functions as follows: after the micro/nanoparticle-reinforced tin-based alloy solder powder is compounded with low-melting-point SnBi-based alloy powder, micro/nano-sized reinforcing particles have formed highly disperse phases in the tin-based alloy solder powder and these disperse phases are generally microparticles of less than 1 um, so that the solder powder is rapidly corroded and melted by the low-melting-point SnBi solder upon soldering; and since the micro/nanoparticle-reinforced tin-based alloy contains a larger amount of Sn while the SnBi solder contains a smaller amount of Sn, β-Sn phases in the tin-based alloy form an intermetallic compound on a soldering pan in preference to Sn atoms in the SnBi-based alloy solder, thereby slowing down the diffusion of Sn atoms in an SnBi eutectic structure to the soldering pan. The low-melting-point solder is maintained as an SnBi eutectic structure to inhibit the formation of a Bi-rich layer.

In the invention, firstly, the metal Sn is melted into liquid, then micro/nano-sized reinforcing particles are added, and form highly dispersed particles in the molten metal Sn by high-power ultrasonic or mechanical dispersion, and finally, tin-based alloy solder powder reinforced with numerous Sn-based metal-coated dispersed micro/nanoparticles is formed by ultrasonic, centrifugal or gas atomization. In the process of producing the micro/nanoparticle-reinforced tin-based alloy solder powder, the micro/nano-sized reinforcing metal particles added can be directly and fully dispersed by high-power ultrasonic or mechanical dispersion, which solves the problem of agglomeration among the micro/nanoparticles, so that intermetallic compounds can be fully recombined and reacted in a shorter period of time when the formed micro/nanoparticle-reinforced tin-based alloy solder powder is compounded with low-melting-point alloy solder powder in a later stage, and finally the micro/nanoparticles dispersed in soldered joints are fully reacted with the low-melting-point solder to create a "separator" effect that blocks the formation of a Bi-rich layer. The micro/nanoparticles are highly dispersed into powder in advance by high-power ultrasonic or mechanical dispersion, which not only solves the problems of floating and agglomeration of the micro/nano-sized reinforcing particles during the secondary melting, but also solves the problems of slow wetting and dissolution of the micro/nano-sized reinforcing particles and low-melting-point tin powder, enabling the micro/nano-sized reinforcing particles in a later stage to fully function in the preparation method, thereby fundamentally ensuring the strength and mechanical reliability of the soldered joints, which is also a great innovation in the technical method of the invention.

The micro/nanoparticle-reinforced composite solder prepared by the formulation and method of the invention can achieve low-temperature soldering at below 200° C., wherein a low-melting-point alloy is first melted, micro/nanoparticle-reinforced tin-based alloy solder powder is then dissolved and infiltrated by heat mass transfer, and β-Sn phases precipitated from the alloy are easily combined with a copper soldering pan, thereby solving the problems of high brittleness of Bi and low shear strength of a low-melting-point SnBi-based alloy solder.

Micro/nanoparticles are dispersed in soldered joints and re-act as nucleation particles for crystal grains to refine the crystal grains and to play a "separator effect" during the aging period, thereby inhibiting Bi in a low-melting-point SnBi alloy from enrichment and growth, and slowing down the growth of an intermetallic compound. The metal crystal of soldered joints or seams has an isotropic structure and is in the form of a mesh or a dimple, and has no dendritic SnBi eutectic structure so that the reliability of the soldered joint is improved. A composite solder with a specification of T3-T8 can be prepared by the invention, which is suitable for use in fine-pitch micro-soldered joints, meets the development trend of miniaturization, light weight, softness and multi-functional high integration of electronic packaging components, and has great application value and development prospects.

TABLE 1

| | Composite solder | | | | | | Performance evaluation | | |
|---|---|---|---|---|---|---|---|---|---|
| | Micro/nanoparticle- | Low-melting-point alloy solder powder | | | | | | | |
| | reinforced tin-based alloy solder powder | | SnBi58 particle | SnBi35Ag0.3 particle | SnBi57Sb1 Particle | Flux (%) | | Soldering tem- | Compre- Shear hensive |
| | Powder diameter/metal | Proportion % | diameter/ % | diameter/ % | diameter/ % | Rosin-based | Rosin-free | perature/ ° C. | force/ per- N formance |
| Example 1 | T4, SnCu3 | 10 | T3, 80 | / | / | 10 | / | 160 | 70.0 OK |
| Example 2 | T4, SnCu3 | 20 | T4, 70 | / | / | 10 | / | 165 | 78.2 OK |
| Example 3 | T4, SnCu3 | 25 | T3, 65 | / | / | 10 | / | 175 | 78.8 OK |
| Example 4 | T4, SnCu3 | 30 | T4, 60 | / | / | 10 | / | 180 | 80.0 OK |
| Example 5 | T4, SnCu3 | 40 | T4, 50 | / | / | 12 | / | 185 | 79.6 OK |
| Example 6 | T6, SnAg0.3Cu0.7 | 20 | T6, 66 | / | / | 14 | / | 160 | 82 OK |

TABLE 1-continued

| | Composite solder | | | | | | | | | |
|---|---|---|---|---|---|---|---|---|---|---|
| | Micro/nanoparticle-reinforced tin-based alloy solder powder | | Low-melting-point alloy solder powder | | | Flux (%) | | Performance evaluation | | |
| | | | SnBi58 particle | SnBi35Ag0.3 particle | SnBi57Sb1 Particle | | | Soldering tem- | Shear | Compre- hensive |
| | Powder diameter/metal | Proportion % | diameter/ % | diameter/ % | diameter/ % | Rosin-based | Rosin-free | perature/ °C. | force/ N | per- formance |
| Example 7 | T4, SnAg3.5 | 15 | / | T4, 75 | / | 10 | / | 180 | 78.0 | OK |
| Example 8 | T4, SnAg3.5 | 25 | T4, 10 | T4, 55 | / | 10 | / | 180 | 79.1 | OK |
| Example 9 | T4, SnAg3.5 | 30 | T4, 20 | T4, 30 | / | 10 | / | 180 | 78.8 | OK |
| Example 10 | T4, SnAg3.5 | 35 | T4, 30 | T4, 15 | T4/10 | 10 | / | 185 | 80.6 | OK |
| Example 11 | T3, SnSb10 | 20 | / | T4, 70 | / | / | 10 | 180 | 77.5 | OK |
| Example 12 | T3, SnCu0.5Ni0.05 | 20 | / | T4, 70 | / | / | 10 | 180 | 80.6 | OK |
| Example 13 | T3, SnAg1Ni0.05Ce0.006Co0.01 | 20 | / | T4, 70 | / | / | 10 | 180 | 79.5 | OK |
| Example 14 | T3, SnCu0.7-nanographene 0.3 | 20 | / | / | T4, 70 | 10 | / | 170 | 79.3 | OK |
| Example 15 | T3, SnAg1Cu0.5-carbon nanotube 0.02 | 20 | / | / | T4, 70 | 10 | / | 170 | 75.2 | OK |
| Comparative Example 1 | / | / | T3, 90 | / | / | 10 | / | 160 | 35.4 | Ordinary |
| Comparative Example 2 | / | / | / | T3, 90 | / | 10 | / | 180 | 39.8 | Ordinary |
| Comparative Example 3 | / | / | / | / | T3, 90 | 10 | / | 170 | 47.2 | Ordinary |
| Comparative Example 4 | 1-5 μm, copper powder | 5 | T4, 85 | / | / | / | 10 | 180 | <10 | Poor |
| Comparative Example 5 | T3, Sn10Cu90 | 25 | / | / | T4, 64 | 11 | / | 185 | <20 | Relatively poor |
| Comparative Example 6 | T3, SnAgCu305 | 89 | / | / | / | 11 | / | 240 | 91.8 | OK |
| Comparative Example 7 | T3, SnCu3 | 44 | / | T4, 45 | / | 11 | / | 200 | 33 | Ordinary |

What is claimed is:

1. A preparation method of micro/nanoparticle-reinforced tin-based alloy solder powder for making a low-temperature soldering composite solder, comprising the steps of:
    step A1: heating a metal Sn to 345-355° C. to melt into a liquid metal Sn;
    step A2: adding micro/nano-sized metal particles to the liquid metal Sn obtained in the step A1; the micro/nano-sized metal particles comprising any one or two of Cu, Ag and Sb;
    step A3: adding an antioxidant to the liquid metal mixture obtained in the step A2, and extracting residual air in the space containing the liquid metal mixture to a negative pressure state;
    step A4: keeping the liquid metal mixture prepared in the step A3 in a negative-pressure sealed state at 345-355° C., and dispersing the mixture by an ultrasonic or mechanical approach for 30-90 min, wherein frequency of the ultrasonic is 10 kHz-30 kHz and power of the ultrasonic is 1 kW-10 kW, so that the micro/nano-sized metal particles are fully diffusely distributed therein to become a micro/nanoparticle-reinforced tin-based liquid metal having highly dispersed micro/nano-sized metal particles; and
    step A5: delivering the tin-based liquid metal with a temperature of 345-355° C. dispersed in the step A4 to an atomization chamber for atomization, dispersion and forming, controlling the working condition of the atomization chamber at a temperature of 0-50° C., and controlling the oxygen content in the environment of the atomization chamber at 400-2000 ppm; wherein atomization approaches used by the atomization chamber are selected from the group consisting of ultrasonic atomization, centrifugal atomization, and gas atomization; and the tin based liquid metal that is atomized, dispersed, and formed in the atomization chamber is rapidly cooled to become micro/nanoparticle-reinforced tin-based alloy solder powder.

2. The preparation method of micro/nanoparticle-reinforced tin-based alloy solder powder according to claim 1, wherein
    the micro/nano-sized metal particles added in the step A2 have a diameter ranging from 30 nm to 8 μm; and
    in the step A3, an antioxidant is added and then residual air in the space containing the liquid metal mixture is extracted to −0.1 Mpa, and the negative pressure is maintained throughout the step A4.

3. The preparation method of micro/nanoparticle-reinforced tin-based alloy solder powder according to claim 1, wherein the micro/nano-sized metal particles added in the step A2 comprise any one or two of Cu, Ag and Sb, and comprise the following components by mass percentage: 0-3% of Cu, 0-4% of Ag and 0-10% of Sb, which are then mixed to form a liquid micro/nanoparticle-reinforced tin-based metal, and the liquid micro/nanoparticle-reinforced tin-based metal is selected form a group consisting of liquid SnCu, SnSb, SnAg and SnAgCu alloys.

4. The preparation method of micro/nanoparticle-reinforced tin-based alloy solder powder according to claim 3, wherein the micro/nanoparticles added in the step A2 further comprise any one or more particles of 0.01-0.1% of Ni, 0.001-0.05% of Ce, 0.001-0.1% of Co, 0.1-0.9% of nanographene and 0.01-0.05% of carbon nanotubes by mass percentage.

5. The preparation method of micro/nanoparticle-reinforced tin-based alloy solder powder according to claim 1, wherein
the antioxidant added in the step A3 includes rosin or a molten LiCl—KCl salt;
in the step A4, the micro/nanoparticles are subjected to ultrasonic dispersion, the conditions of which to reinforce the tin-based alloy solder powder are as follows: the frequency of the ultrasonic is 10 kHz-30 kHz and the power of the ultrasonic is 1 kW-10 kW;
in the step A4, the micro/nanoparticles are subjected to mechanical dispersion, the condition of which to reinforce the tin-based alloy solder powder is as follows: the linear velocity of a high-speed rotary dispersing paddle is 10 m/s-100 m/s; and
in addition, the preparation method of the reinforced tin-based alloy solder powder further comprises:
step A6: subjecting the micro/nanoparticle-reinforced tin-based alloy solder powder prepared in the step A5 to mechanical sieving or air jet sieving to obtain granular powder with different particle diameter specifications of T3-T8, and then preparing the powder into micro/nanoparticle-reinforced tin-based alloy solder powder with six different size specifications of T3-T8, wherein T3 denotes a particle diameter range of 25-45 μm, T4 denotes a particle diameter range of 20-38 μm, T5 denotes a particle diameter range of 15-25 μm, T6 denotes a particle diameter range of 5-15 μm, T7 denotes a particle diameter range of 2-11 μm, and T8 denotes a particle diameter range of 2-8 μm.

6. A preparation method of a micro/nanoparticle-reinforced composite solder for low-temperature soldering, comprising the steps of:
step B: by mass percentage, weighing 10-40% of the micro/nanoparticle-reinforced tin-based alloy solder powder prepared by the preparation method of micro/nanoparticle-reinforced tin-based alloy solder powder according to claim 1, and then weighing 50-80% of low-melting-point SnBi-based alloy solder powder and 8-15% of a flux respectively; and
step C: mechanically evenly stirring the components weighed in the step B at room temperature to prepare a micro/nanoparticle-reinforced composite solder for low-temperature soldering.

* * * * *